March 1, 1932.  M. ROBINA  1,847,982
GRIP WHEEL
Filed April 12, 1929   2 Sheets-Sheet 1
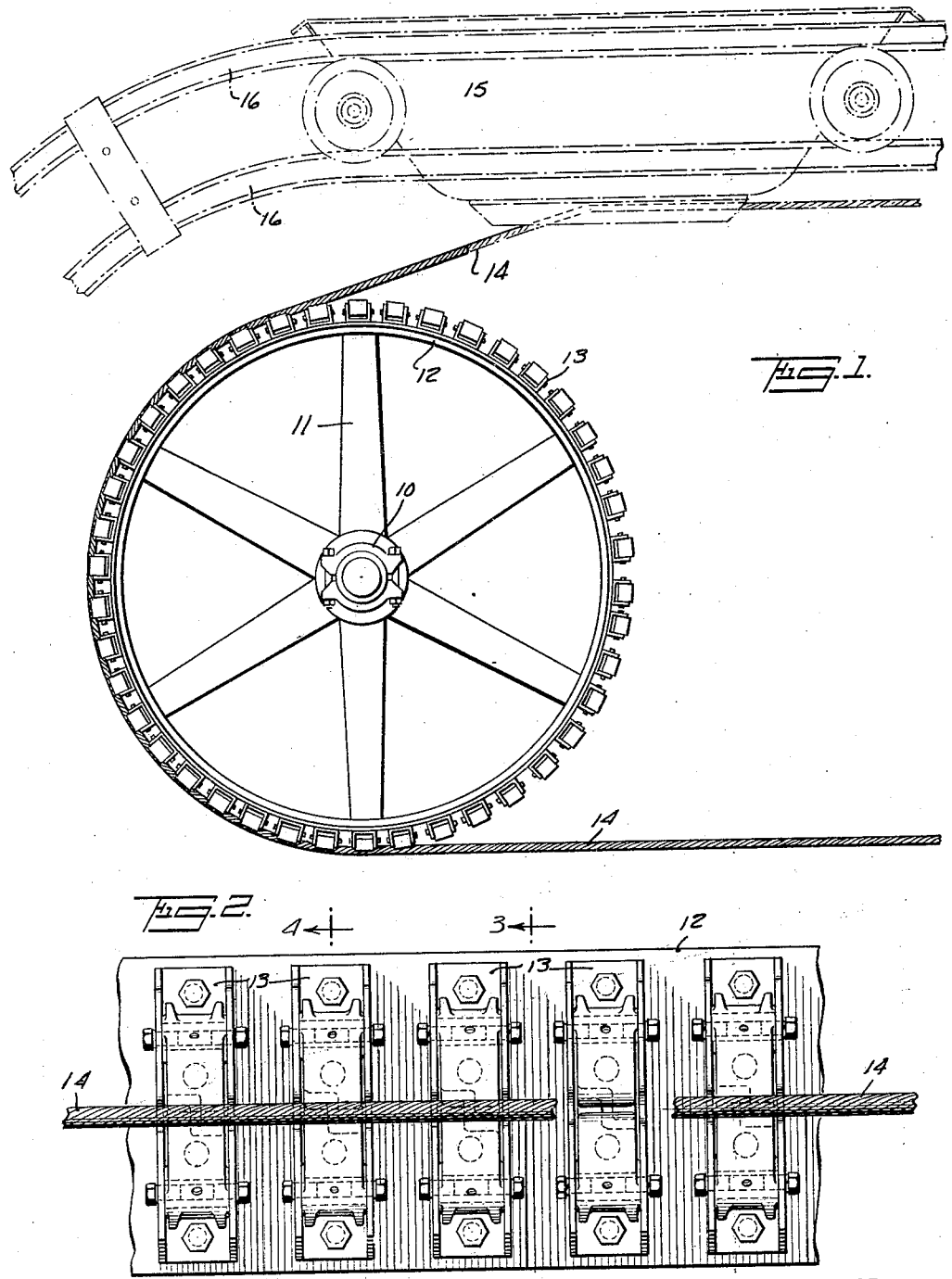
WITNESSES
INVENTOR
Michael Robina
BY
ATTORNEYS March 1, 1932.                M. ROBINA                1,847,982
GRIP WHEEL
Filed April 12, 1929     2 Sheets-Sheet 2
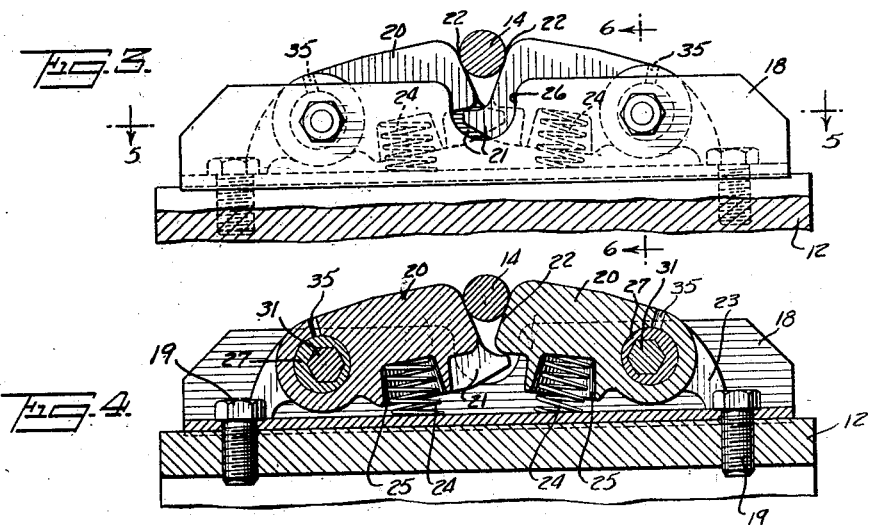
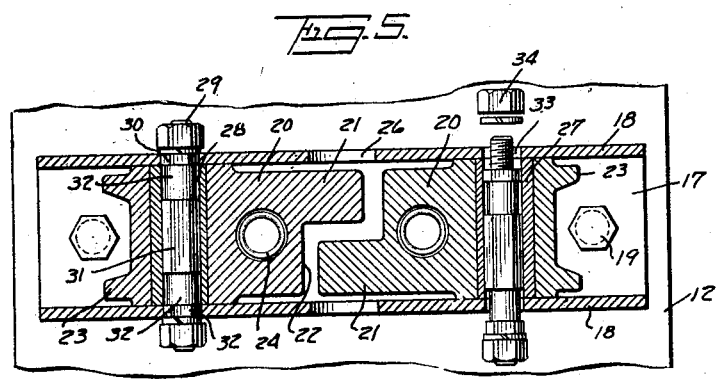
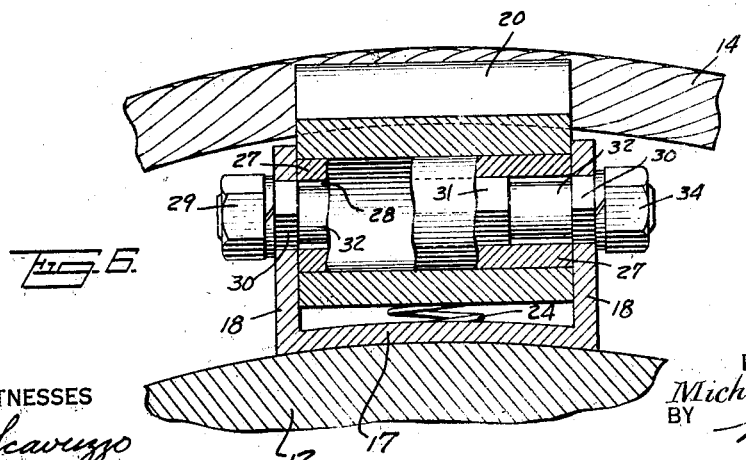
WITNESSES
INVENTOR
Michael Robina
BY
ATTORNEYS Patented Mar. 1, 1932

1,847,982

UNITED STATES PATENT OFFICE

MICHAEL ROBINA, OF NEWARK, NEW JERSEY, ASSIGNOR TO THE INTERSTATE EQUIPMENT CORPORATION, OF NEW YORK, N. Y., A CORPORATION OF NEW YORK

GRIP WHEEL

Application filed April 12, 1929. Serial No. 354,641.

This invention relates to grip wheels.

The invention relates more particularly to grip wheels or traction wheels for the driving of cables as in conveyor systems or the like.

It is among the objects of the present invention to provide an improved grip wheel including novel and improved traction elements associated therewith.

A further object of the invention is to provide an improved traction element for grip wheels, including a pair of co-operating pivoted members which by a toggle or camming action increase the traction provided thereby in proportion to the tension of the cable associated therewith.

A further object of the present invention is to provide improved traction members including novel and improved adjusting means whereby the co-operation of such members may be readily adjusted without requiring the complete disassembly of the device.

A further important object of the invention is to provide a grip wheel and traction element therefor so constructed that a large number of traction elements may be associated with the wheel and adjustment thereof may be readily had.

Numerous other objects and features of the invention include the combination and interrelation of parts whereby the whole forms a novel, improved, efficient and economic structure.

From a consideration of the following specification, it will be seen that the invention provides for the close association of the traction elements on the wheel, whereby an improved traction effect is provided and whereby the alinement of the traction elements may be such as to avoid a twist of the cable passing over the wheel.

Numerous other objects, features and advantages of the present invention will be apparent from a consideration of the following specification, taken in conjunction with the accompanying drawings, in which Figure 1 is a side elevation of one preferred embodiment of the present invention illustrating its association with other apparatus;

Fig. 2 is a top plan view of the grip wheel illustrated in Fig. 1;

Fig. 3 is a sectional view taken on the lines 3—3 of Fig. 2;

Fig. 4 is a sectional view taken on the lines 4—4 of Fig. 2;

Fig. 5 is a sectional view taken on the lines 5—5 of Fig. 3;

Fig. 6 is a sectional view taken on the lines 6—6 of Fig. 3.

In connection with the present invention, it will be understood that the invention relates to certain improvements in the construction of existing grip wheels. The present invention seeks to improve the commonly used grip wheel in that the construction is such that an increased number of the traction elements may be mounted on a single wheel surface, thus increasing the traction of the wheel. The present invention also improves the common construction of such devices by the provision of novel and improved means for adjusting the distance between the usual pivoted gripping elements.

Referring more particularly to Fig. 1 of the drawings, the wheel includes the usual hub 10 and radiating spokes 11, which carry the peripheral flange 12. Mounted upon the flange 12 are the traction members generally illustrated at 13 in Fig. 1. Over the wheel and between the engaging lugs of the traction elements 13, as will be hereinafter described in detail, a cable 14 passes. It will be understood that movement of the cable is designed to be controlled by rotation of the wheel. In connection with Fig. 1, as illustrated in dotted lines, the present invention is admirably suited for conveyor systems of the type disclosed and including a wheeled car or bucket 15, which is supported and guided by the rails 16 and which is associated with the cable 14 for movement in response to rotation of the wheel. It will, of course, be understood that the present invention relates to the wheel and its associated traction wheel and that it may be used with any desired type of cable and with any conveyor system or other apparatus in which a cable is utilized.

Referring more particularly to the figures of the drawings disclosing the detail construction of the traction members, it will be seen that the members include a base or housing member having a bottom 17 and parallel upwardly extending side walls 18. The housing member is elongated, the bottom 17 being slightly curved in transverse section to conform with the radius of the flange 12. It will be seen that the housings are designed to be positioned in close parallel relation upon the flange 12 to which they may be secured by bolts 19 extending therethrough. It will be understood, of course, that the housings may be secured to the flange in any other desired manner and that the invention is not confined to the specific securing members.

For co-operative engagement with the cable 14, there is provided a pair of complementary pivotally moving lugs 20 which are mounted between the side walls 18 of the housing and including oppositely offset fingers 21 having co-operating cable-engaging faces 22. As seen in the drawings, the fingers 21 of the lugs 22 interlock in spaced relation whereby the extremities of the fingers while the lugs are in upward position, engage the under side of the associated lugs to assist in limiting the upward pivotal movement thereof. The opposite extremities of the lugs 20 are each provided with a pair of projecting stop members 23 which when the lugs are in raised pivotal position, contact with the bottom 17 to limit such movement, the raised position of the lugs referred to being disclosed in Fig. 4.

For normally retaining the lugs in raised pivotal position, spring elements 24 are provided, the lower ends of which rest upon the bottom 17, while the upper ends are received within recesses 25 in the lugs 20, the arrangement being such that downward pivotal movement of the lugs is against the tension of the springs 24.

To permit the inward movement of the cable 14 between the lugs and clamped thereby, the side flanges 18 are cut out as at 26 in line with the co-operating inner portions of the lugs. For adjustably pivoting the lugs for longitudinal adjustment between the sides 18, the lugs are mounted upon sleeves 27 which are cylindrical in external cross section and which are eccentrically bored to provide an internal hexagonal bore 28 which receives therethrough a bolt 29 including hexagonal flanges 30 adjacent its ends and a central hexagonal portion 31, the intermediate portion of the bolt, 32, being cylindrical. The bolt 29 extends through and projects from the sleeve 27, the flanges 30 being received in co-operating hexagonal apertures 33 in the side walls 18, the bolt 29 being secured by a suitable nut and washer 34.

In the operation of the device, the cable 14 encircles the wheel, being received upon the surfaces 22 of the lugs 20, which when the cable is slack, are in the upwardly pivoted position shown in Figs. 3 and 4. When the device is applied to the cable which would normally tend to cause a slipping of the cable over the wheel, the lugs 20 move downwardly under the pressure of the cable, the downward rocking of the lugs compressing the cable 14 therebetween in a manner to firmly grip the same and provide adequate traction of the wheel with respect to the cable. The downward movement of the lugs is in opposition to the tension of the springs 24, which are compressed by such movement. The upward movement of the lugs is restricted within predetermined limits by the size and configuration of the stops 23 and by the interlocked relation of the projecting fingers 21 of the lugs. It will be understood that the pivotal movement of the lugs is with respect to the sleeves 27, the lugs rotating thereover. For lubricating the sleeves 27 to permit free movement of the lugs thereover, suitable oil ducts 35 are provided through which oil may be applied to the surface of the sleeves from the upper side of the lugs 20.

For adjusting the relationship of the lugs longitudinally of the housing, the nut 34 is removed and the bolt 29 slipped with respect to the sleeves 27, whereby the hexagonal flanges 30 will be moved from their apertures 33 and by a suitable wrench the bolt may be turned, turning with it the sleeves through the engagement of one of the flanges 30 and the central hexagonal portion 31. The rotation of the sleeve, due to the eccentricity of the central bore, will effect a difference in the longitudinally spacing of the axes of the lugs 20. The adjusting operation is accomplished while the bolt is in the partially withdrawn position shown in Fig. 5. It will be seen that the necessity of entirely removing the bolt or the necessity of using removable shims, bushings, or the like, is avoided. This feature of the present invention is especially valuable in that it provides for the close spacing of the traction elements upon the wheel, the necessity for providing space for the entire removal of the pivot bolt being avoided.

From the foregoing it will be readily seen that the present invention provides a novel and efficient traction wheel and traction elements therefor, which may be readily adjusted to compensate for wear and which will be effective in increasing the traction of the wheel with respect to the cable in response to increased weight applied to the cable.

It will be readily understood that the present preferred embodiment of the invention is only one of manifold variations in structural details and that numerous changes, modifications and the full use of equivalents may be resorted to without departing from the spirit or scope of the invention as outlined in the appended claims.

What is claimed is:

1. A grip wheel, including a peripheral surface and spaced traction elements mounted thereon, said elements having alined central openings, and relatively adjustable lugs co-operating with each other at said openings to receive and grip a cable in response to tension applied to the cable.

2. A cable traction element, including a base, lugs pivotally mounted on said base, said lugs including co-operating cable-engaging faces, said lugs being movable in response to pressure applied thereto by a cable, and pivot sleeves for adjusting said lugs with respect to each other.

3. A cable traction element, including a base, lugs pivotally mounted on said base, said lugs including co-operating cable-engaging faces, said lugs being movable in response to pressure applied thereby by a cable, pivot sleeves for adjusting said lugs with respect to each other, and resilient elements for retaining said lugs in normal spaced relation.

4. A cable traction element, including a transversely arcuate base, lug members pivotally connected with said base, and means for adjusting the spaced relation of the pivot points of said lug members.

5. A cable traction element, including a transversely arcuate base having vertically extending side walls, lug members pivotally connected with said base between said walls, and means for adjusting the spaced relation of the pivot points of said lug members.

6. A cable traction element, including a transversely arcuate base having vertically extending side walls, lug members pivotally connected with said base between said walls, and means for adjusting the spaced relation of the pivot points of said lug members, said means including a rotatable sleeve eccentrically mounted on said base.

7. A cable traction element, including a transversely arcuate base having vertically extending side walls, lug members pivotally connected with said base between said walls, and means for adjusting the spaced relation of the pivot points of said lug members, said means including a rotatable sleeve eccentrically mounted on said base between said side walls.

8. A cable traction element, including a transversely arcuate base having vertically extending side walls, lug members pivotally connected with said base between said walls, means for adjusting the spaced relation of the pivot points of said lug members, said means including a rotatable sleeve eccentrically mounted on said base between said side walls, and means for constantly urging said lug members into a cable receiving relation.

9. A cable traction element, including a transversely arcuate base having vertically extending side walls, lug members pivotally connected with said base between said walls, means for adjusting the spaced relation of the pivot points of said lug members, said means including a rotatable sleeve eccentrically mounted on said base between said side walls, means for constantly urging said lug members into a cable receiving relation, and means for limiting said movement of said lug members.

10. A cable traction element, including a transversely arcuate base having vertically extending side walls, lug members pivotally connected with said base between said walls, means for adjusting the spaced relation of the pivot points of said lug members, said means including a rotatable sleeve eccentrically mounted on said base between said side walls, means for constantly urging said lug members into a cable receiving relation, means for limiting said movement of said lug members, and recesses in said side walls co-operating with the extremities of said lug members to receive and guide a cable.

11. A device of the character described, including a wheel having a peripheral arcuate shaped flange, a plurality of gripping elements carried by said wheel and extending transversely across said flange, said elements including a base transverely arcuate to conform with the arcuate configuration of said flange, and a pair of pivotally mounted jaws receivable within said base, said base having side members for retaining said jaws therebetween, said side members being intermediately recessed to permit a cable to extend below their outer edges, said side members being apertured to receive eccentric bushings, pivot members for said gripping elements respectively received in said bushings, the aperture in one of said side members being non-circular, each pivot member having a non-circular portion to prevent rotation of the pivot member when said non-circular portion is fully received in the non-circular aperture in the related side member.

MICHAEL ROBINA.